INVENTORS
WILLIAM CULL
BY PHILIP HUTCHINSON
Young & Thompson
ATTORNEYS

INVENTORS
WILLIAM CULL
PHILIP HUTCHINSON
BY
Young & Thompson
ATTORNEYS

United States Patent Office 3,452,558
Patented July 1, 1969

3,452,558
UNIVERSAL JOINTS
William Cull, Hest Bank, near Lancaster, and Philip Hutchinson, Little Pitts Close, Birmingham, England, assignors to Birfield Engineering Limited, London, England
Filed Sept. 18, 1967, Ser. No. 668,602
Claims priority, application Great Britain, Sept. 24, 1966, 42,741/66; Jan. 18, 1967, 2,571/67
Int. Cl. F16d 3/30, 3/84
U.S. Cl. 64—21          10 Claims

ABSTRACT OF THE DISCLOSURE

A universal joint of the constant velocity type capable of accommodating "plunge," i.e. relative axial movement of inner and outer drive members, has inner and outer members grooved to provide ball tracks which are angularly distributed around the joint axis and engaged by torque-transmitting balls.

---

Figure 1:
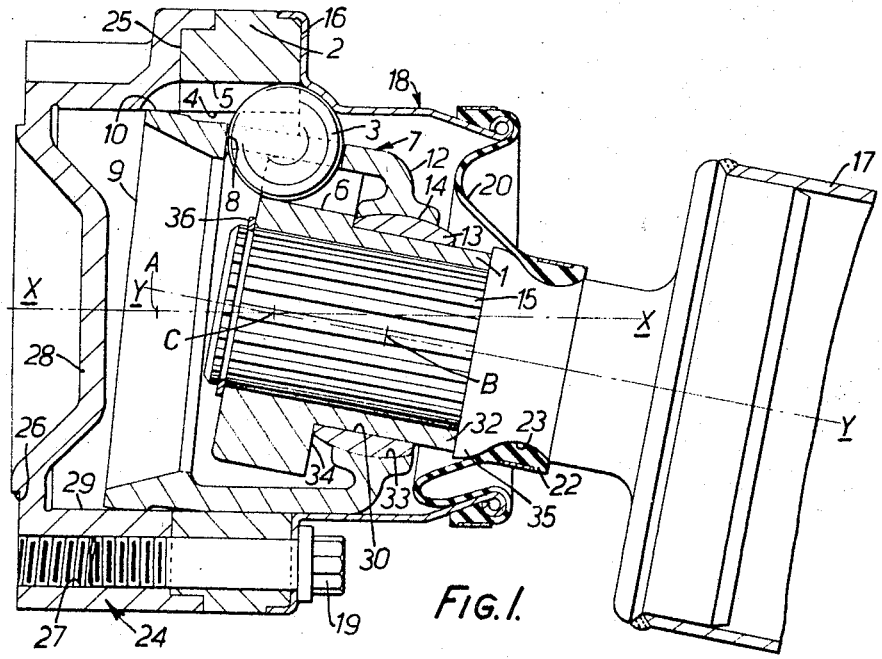

A ball cage controls the positions of the balls, and a guide member is free to move axially of the inner member and is attached either to the cage or to the inner member and has a convex part-spherical surface which engages in, and allows angular movement of the guide member with respect to, the other of these two members to control movement of the cage which has a part-spherical external surface which engages a cylindrical bore in the outer member. The surfaces have centres of curvature which are offset by a substantially equal amount on opposite sides of the joint centre along the axis with the centre always positioned on the axis of the member.

This invention relates to universal joints of the constant velocity type which are capable of accommodating "plunge," i.e. relative axial movement of inner and outer drive members of the joint. Joints of this type have inner and outer members grooved to provide ball tracks which are angularly distributed around the joint axis and engaged by torque-transmitting balls which move along the grooves during joint articulation and plunge.

The constant velocity characteristics of such a joint depend on accurate location of the balls so that for all joint angles the ball centres lie in a median plane of the joint, i.e. a plane which passes through the instantaneous centre of the joint and bisects the angle between the instantaneous input and output axes of the joint. Such axes are the rotational axes of the two joint members and the joint centre is the point at which these axes intersect; the term "joint axis" as used herein refers to the common input and output axis in the condition of zero joint angle.

Ball guidance is most conveniently achieved by means of a cage in which the balls are contained, the cage position being suitably controlled. In this type of construction simple straight ball tracks can be used for location of the balls, in which case ball guidance relies mainly on the cage. Alternative track formations may be used which improve ball guidance, but prior constructions of this and the foregoing type have suffered from the disadvantage that some skidding of the balls takes place during plunge. The object of the present invention is to provide a constant velocity plunge joint in which the position of a ball cage is controlled in a simple and accurate manner with substantially no skidding of the balls along the ball tracks during plunge.

According to the invention a constant velocity joint has a hollow outer member formed with internal longitudinally extending grooves, an inner member formed with external grooves which cooperate with the grooves in the outer member to provide ball tracks, torque-transmitting balls which engage and roll along the grooves during joint articulation and plunge, a ball cage with apertures in which the balls are received and which is operative to control the positions of the balls, and a guide member which is free to move axially of the inner member and is attached either to the cage or to the inner member and has a convex part-spherical surface which engages in, and allows angular movement of the guide member with respect to, the other of these two members, i.e. the inner member or the cage to control movement of the cage which is also controlled by way of a part-spherical external surface on the cage which engages a cylindrical bore in the outer member or a member fixed thereto, said part-spherical surfaces having centres of curvature which are offset by a substantially equal amount on opposite sides of the joint centre along the joint axis with the centre of the part-spherical surface on the guide member always positioned on the rotational axis of the inner membr.

As pure rolling movement of the balls is the aim of the invention, straight track grooves parallel to the axes of the joint members may be used, and these are conveniently of elliptical cross-section. As the cage is not constrained so that it has to move axially with the inner member it is free to follow the movement of the ball centres during plunge as the balls roll along the tracks, at the same time being positively located between the inner and outer members by way of said part-spherical surfaces so that it must move through half the angle between the inner and outer members during a change in joint angularity. Thus, whatever the conditions of joint angle or plunge, there is pure rolling motion of the balls along the tracks and the only sliding which occurs is between the balls and their abutments in the cage apertures which is implicit in cage operation and in any case provides negligible frictional resistance. It is essential to allow free axal movement of the cage between the inner and outer members, and sliding movement of the guide member axially of the inner joint member is conveniently limited by suitable means to suit the maximum plunge which the joint is designed to accommodate.

When the guide member is attached to the inner member it is constrained solely for axial movement relatively thereto, with the part-spherical guide member surface engaging a complementary surface providing a seating in the cage and conveniently formed in an end wall of the cage. The guide member is preferably in the form of a guide ring formed externally with said part-spherical surface and internally with a plain cylindrical bore by which it is slidably mounted on the inner joint member itself or on a shaft member associated with the inner member. Although the inner joint member may be formed integrally with the shaft member it is conveniently formed separately with a splined mounting on the shaft member.

The guide ring may be formed for mounting on the shaft member before the inner joint member so that it slides between the latter and a limiti\$g shoulder formed on the shaft member or a circlip or the like let into the shaft member; a circlip or the like let into the shaft member may perform the dual function of locating the inner joint member in one axial direction and limiting sliding movement of the guide member in the opposite direction.

The guide member may alternatively be mounted on the end of the shaft member which is suitably extended on the inner side of the inner joint member for this purpose, means such as a circlip being provided to retain the guide member on the shaft member extension and hence limit axial sliding movement of the guide member away from the inner joint member. In all cases axial movement of the guide member and cage assembly may be limited in one or both directions by means in the outer joint member which limit movement of the balls along the outer ball tracks, for example by means of an abutment ring let into the bore of the outer joint member.

The guide member may be attached to the cage so that it does not move relatively thereto and projects into a cylindrical bore in the inner member which is engaged by the part-spherical surface of the guide member. This bore allows the necessary free axial movement of the guide member with respect to the inner member, and the guide member may be in the form of a stud with a stem fixed in an end wall of the cage and a head providing the part-spherical surface. This results in a construction in which the minimum offset of the centres of curvature can be achieved, thus enabling the joint to accommodate the maximum angularity. This construction also enables the plunging movement to be limited if so required by suitable design of the internal surface of the cage to provide abutments for the inner member, thus obviating the necessity for providing separate abutments.

In all cases the guide member, whether attached to the cage or the inner member, is preferably arranged at one end of the cage with the fixed part-spherical surface on the cage formed at or adjacent the opposite end thereof.

As straight ball tracks of simple form can be used the outer joint member is conveniently of generally cylindrical open-ended form and produced by a broaching operation. The shaft member as usual projects from one end of the outer member and is normally sealed by a flexible rubber boot, and the other end is conveniently closed by a suitable end member or blanking plate. The end member may be suitably formed for connecting the joint in a drive, and may have a spigot portion which fits into counterbore in the outer member. This spigot portion may be ground internally to provide the plain cylindrical surface engaged by the convex part-spherical surface on the cage, to provide a construction which reduces the length of the track grooves in the outer member and hence possibly effects a substantial cost saving.

The actual effective length of the outer joint member is chosen to suit the installation requirements, and may be greater than the maximum rolling plunge in order to accommodate drive tolerances on installation. This is particularly the case when the joint is designed for installation in a motor vehicle transmission system, and beyond the limits of rolling plunge the balls can slide freely under no load conditions.

The number of ball tracks and balls is governed by design considerations, the size of the balls being a factor in the torque capacity of the joint and also being chosen to allow adequate cage clearance for operation at maximum joint angle. One of the design considerations is the choice of an appropriate number of balls to provide smooth cage operation at maximum joint speed, and in most cases six balls is a reasonable compromise between a simple joint construction and smooth cage operation.

Figure 3:
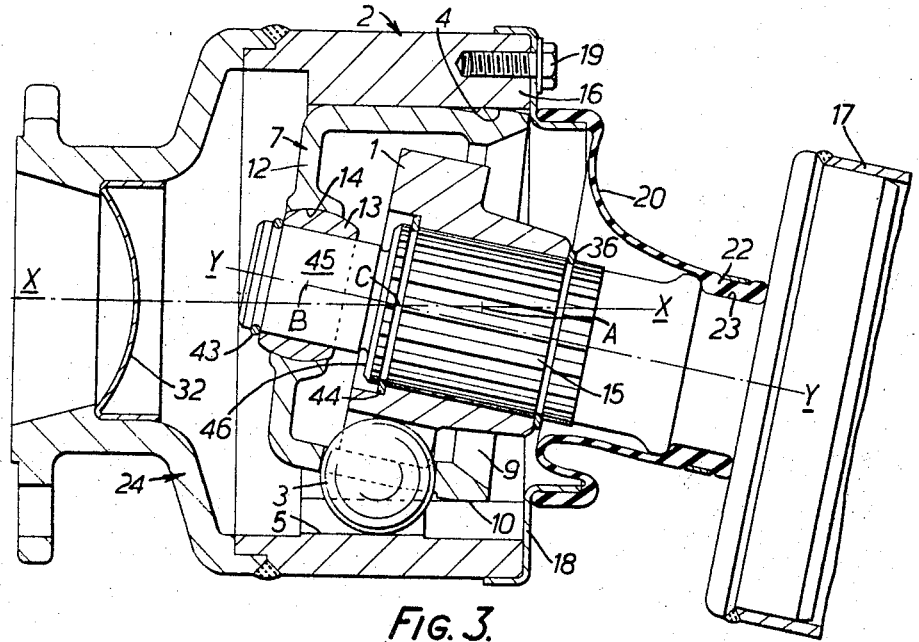
Figure 4:
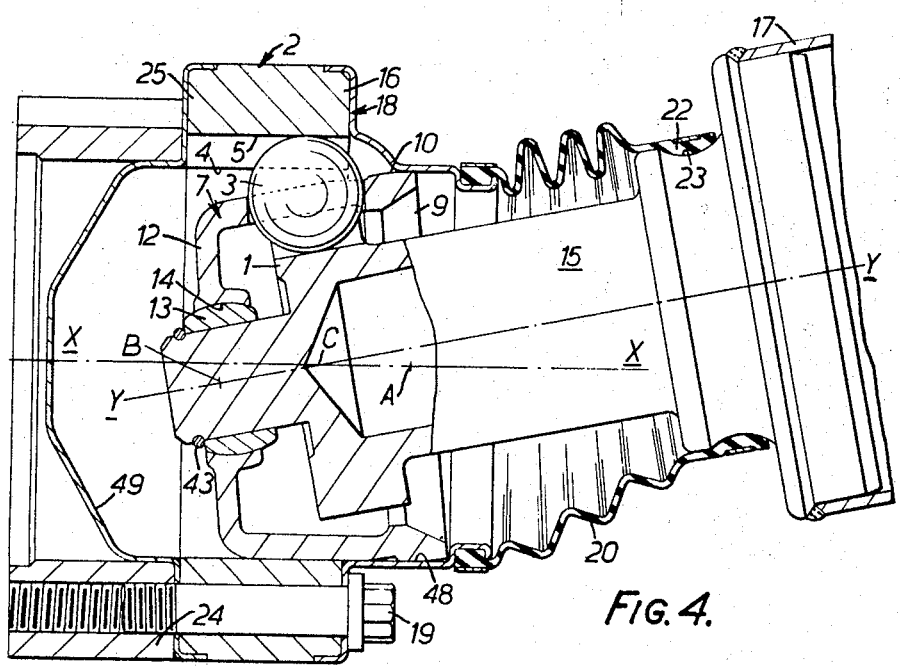
Figure 5:
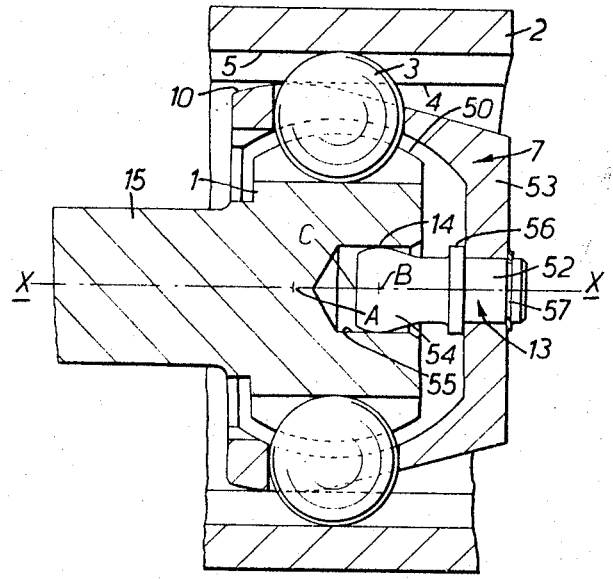
Figure 6:
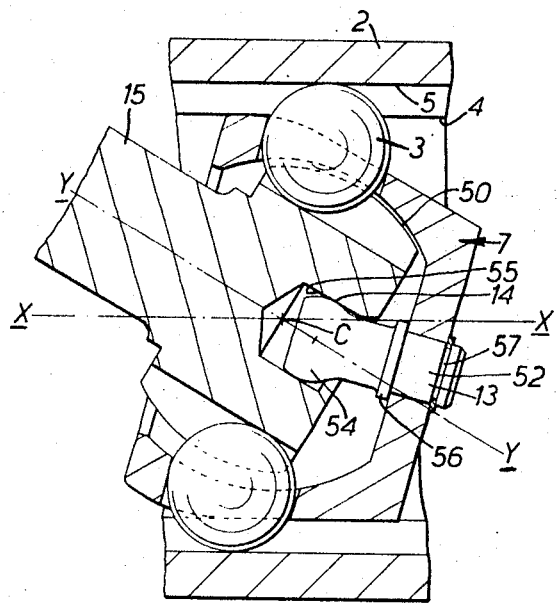

The invention will now be further described with reference to the accompanying drawings which show, by way of example, five constant velocity universal joints each in accordance with the invention and designed for incorporation in a motor vehicle transmission. In the drawings:

FIGURES 1 to 4 are respectively axial sectional views of four of the joints, in each case the joint being shown at the maximum joint angle with the angle of articulation lying in the sectional plane, and FIGURES 5 and 6 show sectional views of the fifth joint with inner and outer members in the zero angle and fully articulated conditions respectively, the outer member being in fragmentary view.

Each joint is capable of accommodating both relative articulation and/or plunge of the inner member 1 with respect to the outer member 2. The inner member 1 is axially movable in the outer member 2, which is of stepped cylindrical and hollow form, and is coupled thereto by a series of six equi-angularly spaced torque-transmitting balls 3. The outer member 2 has a cylindrical through bore 4 with longitudinally extending grooves 5 parallel to the central axis X—X of the outer member 2 which coincides with the joint axis. The inner member 1 has an outer surface similarly machined with straight grooves 6 parallel to the rotational axis Y—Y of the member 1, which again coincides with the joint axis in the zero angle condition. The grooves 5 and 6 in the two members 1 and 2 cooperate in pairs to provide ball tracks along which the balls 3 roll during joint articulation and/or plunge.

A ball cage 7 with side wall apertures 8 or "windows" in which the balls 3 are received is positioned with clearance between the inner and outer members 1 and 2. The cage 7 is of generally tapering form, the degree of taper controlling the maximum obtainable joint angle. The windows 8 are slightly elongated circumferentially of the cage 7 to allow for the very slight lateral movement of the balls 3 which occurs when the joint is at an angle; the balls 3 are an accurate fit in the windows 8 in the axial direction of the cage 7.

The position of the cage 7 is controlled by the relative positioning of the two ends of the cage with respect to the members 1 and 2. At one end 9 the cage 7 has a part-spherical external surface portion forming a convex control surface 10, and the position of the other end 12 of the cage 7 is controlled by a guide member 13 which has a part-spherical external and convex control surface 14.

The two control surfaces 10 and 14 have centres of curvature A and B respectively offset by substantially equal amounts on opposite sides of the joint centre C along the point axis, in the zero joint angle condition. This geometry ensures that the cage 7 is accurately controlled so that the ball centres remain in the median plane of the joint for all joint conditions. As the cage 7 is not constrained to move axially with the inner member 1 it is free to follow the movement of the ball centres during plunge which occurs with a pure rolling action of the balls 3 along the ball tracks, and plunge is not accompanied by skidding of the balls 3 in the tracks. It will be appreciated that the cage 7 moves through half the angle which the inner member 1 moves through when articulation of the joint takes place. In addition, the axial distance moved by the cage 7 with respect to the outer member 2 is half the distance moved by the inner member 1 with respect to the outer member 2 when the joint accommodates plunge.

Figure 2:
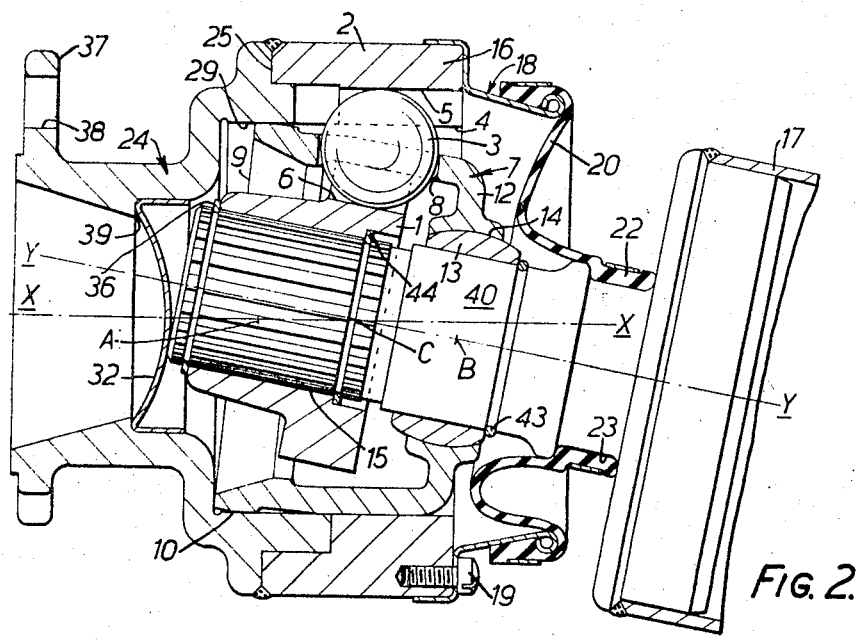

In the joints shown in FIGURES 1 to 3, the inner member 1 is axially located on a splined shaft member 15 which projects from the outer end 16 of the member 2 and which is welded to a tubular drive shaft 17 in the vehicle transmission. A pressed metal annular outer end member 18 is secured by bolts 19 to the member 2 and is clamped to one end of a flexible rubber boot 20 the other end of which has a thickened portion 22 clamped in an annular groove 23 in the shaft member 15.

Referring to the joint of FIGURE 1, an inner end member 24 is secured, by the bolts 19, to the inner end 25 of the member 2 and has a spigot 26 and a ring of bolt holes 27 through which the bolts 19 pass. The bolts 19 and spigot 26 enable the end member 24 to be connected in the vehicle transmission. A central web 28 of the end member 24 closes the corresponding end of the joint and prevents the ingress of foreign matter.

The end 9 of the cage 7 is arranged inwardly of the joint and the control surface 10 engages a bore 29 in the end member 24, and the guide member 13 is in the form of a ring a plain cylindrical bore 30 of which is slidable on a coaxial reduced-diameter extension 32 of the inner member 1. The control surface 14 of the ring 13 engages a seating 33 provided by a complementary part-spherical surface formed in the end 12 of the cage 7. Axial movement of the guide ring 13 and, therefore, the operational plunge of the joint is limited in the inward direction by engagement of the ring 13 with the adjacent end 34 of the inner member 1 and in the outward direction by the ring 13 engaging a shoulder 35 formed on the shaft member 15. Positive axial location for the member 1 on the shaft member 15 is provided by the shoulder 35, against which the extension 32 abuts, and a circlip 36 let into a recess at the extreme inner end of the shaft member 15.

As movement of the guide ring 13 and cage 7 assembly is limited as described the tracks in the outer member 2 may be of any desired length, for example not only to accommodate the maximum plunge during joint operation but also to accommodate vehicle build errors on installation. In this case the central assembly of inner member 1, cage 7 and balls 3 takes up its natural position in the outer joint member 2 on installation. If, in doing so, the cage 7 and guide ring 13 reach the limit of axial sliding movement with respect to the inner joint member 1 the balls 3 will skid in the ball tracks until the natural position is reached. Thereafter, during joint operation within the limits of operational plunge, a pure rolling action of the balls 3 will obtain.

In the remaining forms of joint, similar parts have, where appropriate been given the same reference numerals. In the joint of FIGURE 2, the end member 24 is welded to the end 25 of the outer member 2 and has a coupling flange 37 with holes 38 for bolting the member 24 in the vehicle transmission. The member 24 is hollow and has a radial step 39 at an axially intermediate point, the step 39 acting to locate a dished closure member 32. The control surface 10 is again arranged at the inner end of the cage 7 and is engageable with the cylindrical bore 29 in the end member 24, but in this case the guide ring 13 is slidable on a cylindrical portion 40 of the shaft member 15 and inward plunging movement of the cage 7 with the outer member 2 is limited by the engagement of the ring 13 with a spring ring 43 let into the shaft member 15. In addition to the circlip 36, positioned at the inner end of the shaft member 15, a further circlip 44 is provided for axial location of the inner member 1 on the shaft member 15.

The cage 7 is, in each of the joints of FIGURES 3 and 4, axially reversed as compared with the arrangements previously described. In the arrangement of FIGURE 3, the control surface 10 engages the bore 4 which is formed towards the outer end 16 of the outer member 2. The ring 13 is axially slidable on an inner reduced-diameter cylindrical projection 45 of the shaft member 15, the end 12 of the cage 7 having the associated seating 14 accordingly arranged inwardly. The inner and outer limits of operational plunge are respectively reached when the ring 13 abuts a shoulder 46 on the shaft member 15 and a spring ring 43 let into the projection 45.

The inner member 1 of the joint of FIGURE 4 is integral with the shaft member 15 and the ring 13 is axially slidable on an inner coaxial extension of this integral component. Instead of being slidable in a bore in the outer member 2, the control surface 10 on the cage 7 is slidable in a cylindrical portion 48 of the end member 18. A closure plate 49 has an outer rim secured by the bolts 19 between the end 25 of the member 2 and the end member 24.

In the final form of joint shown in FIGURES 5 and 6 the control surface 10 is formed at the outer end of the cage 7 and again engages the bore 4 in the outer member 2. The inner member 1 has a part-spherical grooved outer surface 50 and the guide member 13 is in the form of a stud, with a stem 52 which is fixed in an inner end wall 53 of the cage 7 and a head 54 providing the part-spherical control surface 14 of the member 13. The stud 13 projects inwardly of the cage 7 for engagement with a central bore 55 in the inner member 1, along which bore the head 54 moves during joint operation. The stem 52 has a locating shoulder 56 which engages the end wall 53, against which it is retained by a circlip 57 let into the stem 52 on the other side of the wall 53.

We claim:

1. A constant velocity joint having a hollow outer member formed with internal longitudinally extending grooves, an inner member formed with external grooves which cooperate with the grooves in the outer member to provide ball tracks, torque-transmitting balls which engage and roll along the grooves during joint articulation and plunge, a ball cage with apertures in which the balls are received and which is operative to control the positions of the balls, and a guide member which is free to move axially of but is attached to the inner member and has a convex part-spherical surface which engages in, and allows angular movement of the guide member with respect to, the cage, to control movement of the cage which is also controlled by way of a part-spherical external surface on the cage which engages a cylindrical bore the axis of which is fixed with respect to the outer member, said part-spherical surfaces having centres of curvature which are offset by a substantially equal amount on opposite sides of the joint centre along the joint axis with the centre of the part-spherical surface on the guide member always positioned on the rotational axis of the inner member.

2. A joint according to claim 1, wherein the construction is such as to limit sliding movement of the guide member axially of the inner joint member.

3. A joint according to claim 1, wherein a complementary seating engaged by said part-spherical surface of the guide member is formed in an end wall of the cage.

4. A joint according to claim 1, wherein the guide member is in the form of a ring formed externally with said part-spherical surface and formed internally with a plain cylindrical bore by which it is slidably mounted on the inner joint member.

5. A joint according to claim 4, wherein the inner joint member is separately formed and has a splined mounting on the shaft member, and the guide ring is formed for mounting on the shaft member before the inner joint member during assembly of the joint, when assembled sliding movement of the guide ring on the shaft member being limited on the one hand by the inner joint member and on the other hand by a projection on the shaft member.

6. A joint according to claim 4, wherein the guide ring is slidably mounted on the inner side of the inner joint member and the centre of curvature of the part-spherical surface on the cage is positioned outwardly of the joint centre.

7. A joint according to claim 1, wherein said cylindrical bore is formed in a member attached to the outer member.

8. A constant velocity joint having a hollow outer member formed with internal longitudinally extending grooves, an inner member formed with external grooves which cooperate with the grooves in the outer member to provide ball tracks, torque-transmitting balls which engage and roll along the grooves during joint articulation and plunge, a ball cage with apertures in which the balls are received and which is operative to control the positions of the balls, and a guide member which is free to move axially of the inner member and is attached to the cage and has a convex part-spherical surface which engages in, and allows angular movement of the guide member with respect to, the inner member to control movement of the cage which is also controlled by way of a part-spherical external surface on the cage which engages a cylindrical bore the axis of which is fixed with respect to the outer member, said part-spherical surfaces having centres of curvature which are offset by a substantially equal amount on opposite sides of the joint centre along the joint axis with the centre of the part-spherical surface on the guide member always positioned on the rotational axis of the inner member.

9. A joint according to claim 8, wherein the guide member is attached to the cage so that it does not move relatively thereto and projects into a cylindrical bore in the inner joint member, which bore is engaged by the part-spherical surface of the guide member.

10. A joint according to claim 9, wherein the guide member comprises a stud with a stem fixed in an end wall of the cage and a head formed with said part-spherical surface.

References Cited

UNITED STATES PATENTS

| | | | |
|---|---|---|---|
| 2,911,805 | 11/1959 | Wildhaber | 64—21 |
| 2,914,930 | 12/1959 | Wildhaber | 64—21 |
| 3,162,024 | 12/1964 | Breuer et al. | 64—21 X |
| 3,176,476 | 4/1965 | Cull | 64—21 X |
| 3,237,429 | 3/1966 | Henry-Biabaud | 64—21 X |
| 3,362,193 | 1/1968 | Ritsema | 64—32 |

HALL C. COE, *Primary Examiner.*

U.S. Cl. X.R.

64—32